United States Patent [19]

Townsend et al.

[11] 4,028,236

[45] June 7, 1977

[54] RECOVERY OF MERCURY

[75] Inventors: Douglas W. Townsend, Port Credit; H. Douglas Woods, Ottawa, both of Canada

[73] Assignee: Ontario Research Foundation, Sheridan Park, Canada

[22] Filed: Jan. 21, 1975
(Under Rule 47)

[21] Appl. No.: 542,853

[30] Foreign Application Priority Data

Jan. 21, 1974 United Kingdom .............. 2781/74

[52] U.S. Cl. ................. 210/45; 210/50; 210/63 R; 75/109
[51] Int. Cl.² .......................................... C22B 3/00
[58] Field of Search .......... 75/81, 109, 64; 210/50, 210/42, 47, 63 R, 62, 45

[56] References Cited

UNITED STATES PATENTS

| | | | |
|---|---|---|---|
| 3,039,865 | 6/1962 | Gilbert | 75/109 |
| 3,764,528 | 10/1973 | Cadmus | 210/50 |
| 3,788,842 | 1/1974 | Nolte et al. | 75/109 |

FOREIGN PATENTS OR APPLICATIONS 47-38709  9/1972  Japan .................... 210/50

*Primary Examiner*—Thomas G. Wyse
*Assistant Examiner*—Benoit Castel
*Attorney, Agent, or Firm*—Sim & McBurney

[57] ABSTRACT

Mercury present in liquid effluents, for example, the effluent from a caustic-chlorine plant using a flowing mercury cathode, is removed by first converting the mercury to a metallic or soluble form and thereafter contacting the solution with tin-coated iron strips having tin-iron interfaces in contact with the solution. The invention also is applicable to the recovery of mercury from existing accumulations in water body sediment.

9 Claims, No Drawings

RECOVERY OF MERCURY

FIELD OF INVENTION

This invention relates to the removal of mercury from effluent streams and from existing accumulations of discharged mercury.

BACKGROUND TO THE INVENTION

Mercury and its salts have been discharged to water bodies, such as streams, rivers and lakes, from various sources, such as the liquid effluent from a sodium hydroxide-and chlorine-producing plant in which flowing mercury cathodes are used in the electrolysis of sodium chloride solutions.

This discharge has resulted in accumulation of mercury in various forms in river and lake bed sediments. Natural biological processes convert the mercury to a soluble organic form which is readily absorbed by fish and shell fish. Subsequent eating of the fish by animals, including man, results in accumulation of mercury in the animal body, which may lead to brain damage and ultimately death.

The mercury in the effluents often is at least partially in metallic form, as very minute droplets which are incapable of separation by normal physical separation techniques, such as centrifuging. The mercury also may be present in ionic or soluble organic form in the effluents. Various insoluble mercury salts also may be present in the effluent or the sediment accumulation.

SUMMARY OF INVENTION

In accordance with the present invention, the concentration of mercury in metallic and soluble ionic form in aqueous media containing the same may be decreased, and in many cases substantially eliminated.

The aqueous medium containing the mercury is contacted, in accordance with this invention, with tin-coated iron having exposed tin-iron interfaces in contact with the medium. The metallic mercury "wets" the tin surface and is accumulated thereon and the iron causes the mercury ions to be reduced to the metal which then is collected on the tin surface. The mercury may be recovered from the tin surface in any desired manner, typically by vacuum distillation.

GENERAL DESCRIPTION OF INVENTION

The tin-coated iron used in the invention preferably is in the form of a plurality of strips allowing a high surface area of both tin and iron to contact the aqueous medium, and more particularly is provided by cleaned and chopped, or hammer-milled, tin cans, thereby providing a use for discarded tin cans.

The surface of the tin contacting the aqueous medium preferably is rough to achieve better packing of the strips, enabling intimate contact between the strips and the medium to be attained, and hence, increasing the efficiency of the operation. The roughened surface encourages the accumulation of metallic mercury in the valleys.

The aqueous medium which is contacted by the tin-coated iron may be constituted by the normally-discharged effluent, which now may be discharged as harmless effluent after treatment in accordance with the present invention, typically by simple percolation upwardly or downwardly through a packed column of tin-coated iron strips.

Alternatively, the aqueous medium may be in the form of a slurry of mercury-laden river or lake bed sediment although practical difficulties may arise in providing the mercury in metallic or soluble ionic form where large quantities of organic materials also are present in the sediment. The slurry usually is subjected to agitation while in contact with the tin-coated iron strips in order to maintain as much solid material as possible in suspension. The invention also is capable of application to other industrial or municipal wastes which contain mercury.

The form of the mercury in the aqueous medium should be metallic and/or dissolved ionic, typically mercuric chloride or mercuric nitrate, to enable the removal operations using the tin-coated iron to occur. Mercury in the form of stabilized colloids and organo-metallic forms may be recovered by the process of the invention.

In a typical aqueous effluent from a sodium hydroxide- and chlorine-producing plant quantities of reducing agents, typically carbon arising from graphite electrodes used in the plant are present. The presence of the reducing agents tend to maintain large quantities of mercury in an insoluble form. The present invention is incapable of removing such insoluble form of mercury from the effluent.

Thus, in this type of effluent and other effluents containing an insoluble form of mercury, it is necessary to subject the effluent to one or more treatments, typically by changing the redox potential or pH of the environment of the mercury to convert the same to metallic or soluble ionic form. The particular procedure adopted is dependent on the particular form of the mercury.

In a typical procedure carried out on caustic plant effluent, the effluent, typically having a pH of about 11 to 12 and containing about 35 ppm of mercury, first is filtered which tends to remove some particulate carbon along with some of the mercury. The mercury may subsequently be recovered from the filtered solids by vacuum distillation or the like.

The filtrate thereafter is acidified to a pH of about 6 to 7 whereupon a oxidizing agent, for example sodium hypochlorite or ozone, is added and the resulting solution is digested to allow the insoluble mercury salts, typically mercurous chloride, to be converted to the soluble mercuric form.

The resulting solution then is contacted with the tin plated iron to remove substantially the ionic mercury, typically to a total mercury content of effluent less than about 35 ppb.

The process of the invention may be carried out in any convenient manner, depending on the nature of the aqueous medium. The aqueous medium preferably is deaerated to inhibit rust formation and preferably has a pH below about 12 to minimize dissolving of the tin.

The process is preferably carried out with good contact between the metals and the aqueous medium with a contact time appropriate to remove at least a substantial proportion of the mercury in the aqueous medium.

In certain instances, it may not be desired to recover the mercury removed from the effluent, it being sufficient that the mercury content of the effluent had been eliminated or decreased to an insignificant level. Continued use of the same tin-plated iron column over a period of time may lead to diminution in effectiveness of the material.

EXAMPLES

EXAMPLE 1

A neutral aqueous solution of mercuric chloride in sodium chloride solution was prepared to simulate a filtered, oxidized and aged caustic-chlorine plant effluent.

The solution was allowed to percolate downwardly through a packed column of clean tin-plated iron strips and the mercury content of the solution was measured at various contact times by polargraphic analysis. The results are reproduced in the following Table I:

TABLE I

| Contact Time (Secs.) | Mercury Content ppm (as $HgCl_2$) |
| --- | --- |
| 0 | 15 |
| 165 | 1.06 |
| 216 | 0.44 |
| 592 | 0.04 |
| 1086 | 0.007* |

*This value was confirmed as 30 ppb b AA.

EXAMPLE 2

An aqueous solution containing colloidal mercury was passed in contact with a column of clean tin-plated iron strips and the mercury content of the solution was measured by polargraphic analysis. The results are reproduced in the following Table II:

TABLE II

| Content Time (secs.) | Mercury Content (ppm) |
| --- | --- |
| 0 | 30 |
| 1750 | 1.4 |

The results of the above Examples show that mercury in colloidal metallic and soluble ionic form may be removed in substantial quantities from aqueous media containing the same.

SUMMARY

The present invention enables a potentially harmful pollutant to be removed from effluents before the discharge of the same to water bodies. Modifications are possible within the scope of the invention.

What we claim is:

1. A method for the removal of mercury in metallic form and/or soluble ionic form from a aqueous medium containing such mercury which comprises contacting said aqueous medium with tin-coated iron strips having tin-iron interfaces exposed to the medium to reduce said mercury in soluble ionic form to the metallic form by the iron, accumulating said mercury in metallic form initially present in said aqueous medium and/or formed by said reduction of mercury in soluble ionic form on the tin surface, and separating the tin-coated iron strips having surface accumulated mercury.

2. The method of claim 1 including recovering the mercury from the separated tin-coated iron strips.

3. The method of claim 1 wherein said tin-coated iron strips have a high surface area of both tin and iron for contact with the aqueous medium.

4. The method of claim 3 wherein said strips are formed from tin cans.

5. The method of claim 3 wherein the tin surface of said strips is rough.

6. The method of claim 1 wherein said aqueous medium is derived from a highly alkaline effluent from the formation of caustic soda and chlorine by electrolysis of an aqueous sodium chloride solution using a flowing mercury cathode and a graphite anode.

7. The method of claim 6, wherein said aqueous medium is formed by filtering said highly alkaline effluent to remove filtrable solids therefrom, acidifying the filtered effluent to a pH of about 6 to 7, and oxidizing insoluble salt forms of mercury to metallic or soluble ionic form.

8. The method of claim 7 wherein said oxidation is carried out by subjecting the acidified effluent to at least one oxidizing agent and digesting the effluent under oxidizing conditions.

9. The method of claim 7 wherein said contacting is provided by passing the oxidized effluent through a column packed with strips of tin-coated iron having a high surface area of both tin and iron.

* * * * *